(12) United States Patent
Dai et al.

(10) Patent No.: US 7,468,573 B2
(45) Date of Patent: Dec. 23, 2008

(54) METHOD OF PROVIDING TACTILE FEEDBACK

(75) Inventors: Steve X. Dai, Gilbert, AZ (US); Daniel J. Sadler, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 204 days.

(21) Appl. No.: 11/590,275

(22) Filed: Oct. 30, 2006

(65) Prior Publication Data

US 2008/0100177 A1    May 1, 2008

(51) Int. Cl.
    *H01L 41/00* (2006.01)
(52) U.S. Cl. .................. 310/317; 310/331; 341/20; 341/27
(58) Field of Classification Search .......... 310/328, 310/330–332, 334, 339
    See application file for complete search history.

(56) References Cited

U.S. PATENT DOCUMENTS

| | | | | |
|---|---|---|---|---|
| 5,973,441 A | * | 10/1999 | Lo et al. | 310/330 |
| 6,078,126 A | * | 6/2000 | Rollins et al. | 310/330 |
| 6,218,966 B1 | * | 4/2001 | Goodwin et al. | 341/27 |
| 6,376,967 B2 | * | 4/2002 | Saarmaa et al. | 310/329 |
| 6,710,518 B2 | | 3/2004 | Morton et al. | |
| 6,723,937 B2 | | 4/2004 | Englemann et al. | |
| 2006/0028428 A1 | | 2/2006 | Dai et al. | |
| 2006/0050059 A1 | | 3/2006 | Satoh et al. | |
| 2006/0052143 A9 | | 3/2006 | Tuovinen | |
| 2007/0035526 A1 | * | 2/2007 | Takenaka et al. | 345/173 |
| 2007/0080608 A1 | * | 4/2007 | Maruyama et al. | 310/317 |
| 2008/0122315 A1 | * | 5/2008 | Maruyama et al. | 310/314 |

\* cited by examiner

*Primary Examiner*—Mark Budd

(57) ABSTRACT

A method provides tactile feedback emulating a click like feedback provided by one or more low cost, thin piezoelectric devices (142) to an input device (110) of an electronic device (100), the piezoelectric devices (142) being driven by two or more low voltage pulses (804, 806) within the temporal acuity of human touch.

22 Claims, 3 Drawing Sheets

METHOD OF PROVIDING TACTILE FEEDBACK

FIELD OF THE INVENTION

The present invention generally relates to electronic devices and more particularly to a method of providing a tactile feedback to an input device in a portable communication device.

BACKGROUND OF THE INVENTION

Given the rapid introduction of new types of portable electronic devices (e.g., Personal Digital Assistants, Text messaging pagers, MP3 players, cell phones), and the rapid development of novel functionality, an important objective in designing electronic devices is to provide intuitive user interfaces. Computer mouse-like keys and qwerty keyboards are some examples providing intuitive interfaces. However, these interfaces are directed more at providing input to the electronic device rather than providing content related feedback to a user. Touch screens along with graphical user interfaces (GUI) provide information to the user, but only if the user is looking at the screen.

Devices more recently are actively responding to user input by providing tactile cues or responses to the user. The vibrator in a cell phone or pager is a good example. Other examples include an input key that provides a clicking sound when moved; a key or touch screen that moves suddenly or vibrates in an opposed direction to the input; and a key that moves suddenly or vibrates perpendicular to the direction of input in response to a transducer attached to the device housing.

Morphable user interfaces are expected to be an important design consideration for the next generation of portable electronic devices. Users will find the input interface simpler and more intuitive to use because its physical appearance will match a selected function. However, the conventional means of providing tactile feedback, to a finger for example, has been mechanical dome switches which will not function well with morphable graphic user interfaces; therefore, haptics becomes a critical enabler. While DC rotary or linear vibration motors could provide tactile feedback to a finger input with an optimized driving algorithm, the buzz-like vibration profile is very different from a dome switch that generates a sharp mechanical click at the user's finger. On the other hand, a piezoelectric actuator can produce a much more realistic click sensation which can provide the operator with the illusion that a real physical key has been pressed.

One type of haptic feedback may be found, for example in U.S. Pat. No. 6,710,518. An electromechanical transducer produces an impulse of mechanical energy that propagates through a mounting boss to the entire device. This mechanism is great for providing a "call alert" for example, but does not allow for selective feedback to individual input locations (keys, buttons, arrows, etc).

Another type of haptic feedback is found, for example in U.S. Patent Publications 2006/0050059 and 2006/0052143. One or several piezoelectric actuators are placed, typically at the corners, under an input device that needs to be actuated. The input device could be a keypad or a display with touch sensitive surface. Upon application of a voltage, the piezoelectric actuators deform, either pushing or pulling the entire input device in a given direction and thus give a tactile feedback to the users' hand or finger operating at the input device. The most widely used piezoelectric actuators for this purpose are typically unimorph actuators, which are made of a piezoelectric ceramic element bonded to a metal shim, or bimorph actuators, which are made of metal shim bonded in between of two piezoelectric ceramics elements. Both unimorph and/or bimorph actuators are also referred to as benders. In a unimorph actuator, the bending motion comes from the tendency of either in-plane shrinkage or expansion of the piezoelectric ceramic element under applied electric field against the mechanical constraint from the metal shim. In the case of a bimorph actuator, the two piezoelectric ceramic elements are driven such that one shrinks while the other expands, causing the bending motion. A typical placement of the benders is to anchor the edge of a circular bender, or both ends of a stripe bender, on a base structure. The center of a circular bender, or the middle of a stripe bender which has the maximum displacement, is usually used to drive a mechanical load, as illustrated in both U.S. Patent Publications 2006/0050059 and 2006/0052143. It is noteworthy that the relatively high displacement from bending motion of a unimorph actuator or a bimorph actuator is only possible from the bonded structure of piezoelectric ceramic element(s) and metal shim. A stand alone piezoelectric ceramic could not generate such displacement.

However, the voltage required to drive piezoelectric actuators to their full materials capability is about 3.0 volts/micron. This is approximately 60.0 volts for a multilayer actuator with 20.0 micrometer layer thickness, or 200 volts for a 0.1 micrometer single layer actuator sliced from bulk piezoelectric ceramics, in which the 20.0 micrometer layer and 0.1 micrometer thick actuators are the manufacturing limit. This high voltage requirement to drive piezoelectric actuators in today's small electronic devices is undesirable at best.

Accordingly, it is desirable to provide a method of providing tactile feedback to an input device in a portable communication device. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method provides tactile feedback emulating a click like feedback provided by one or more low cost, thin piezoelectric devices to an input device of an electronic device, the piezoelectric devices being driven by two or more pulses within the temporal acuity of human touch. The method comprises providing a voltage waveform to activate one or more piezoelectric actuators, the waveform comprising at least two pulses within a twenty millisecond duration; and moving the input device in response to the piezoelectric actuators being activated.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
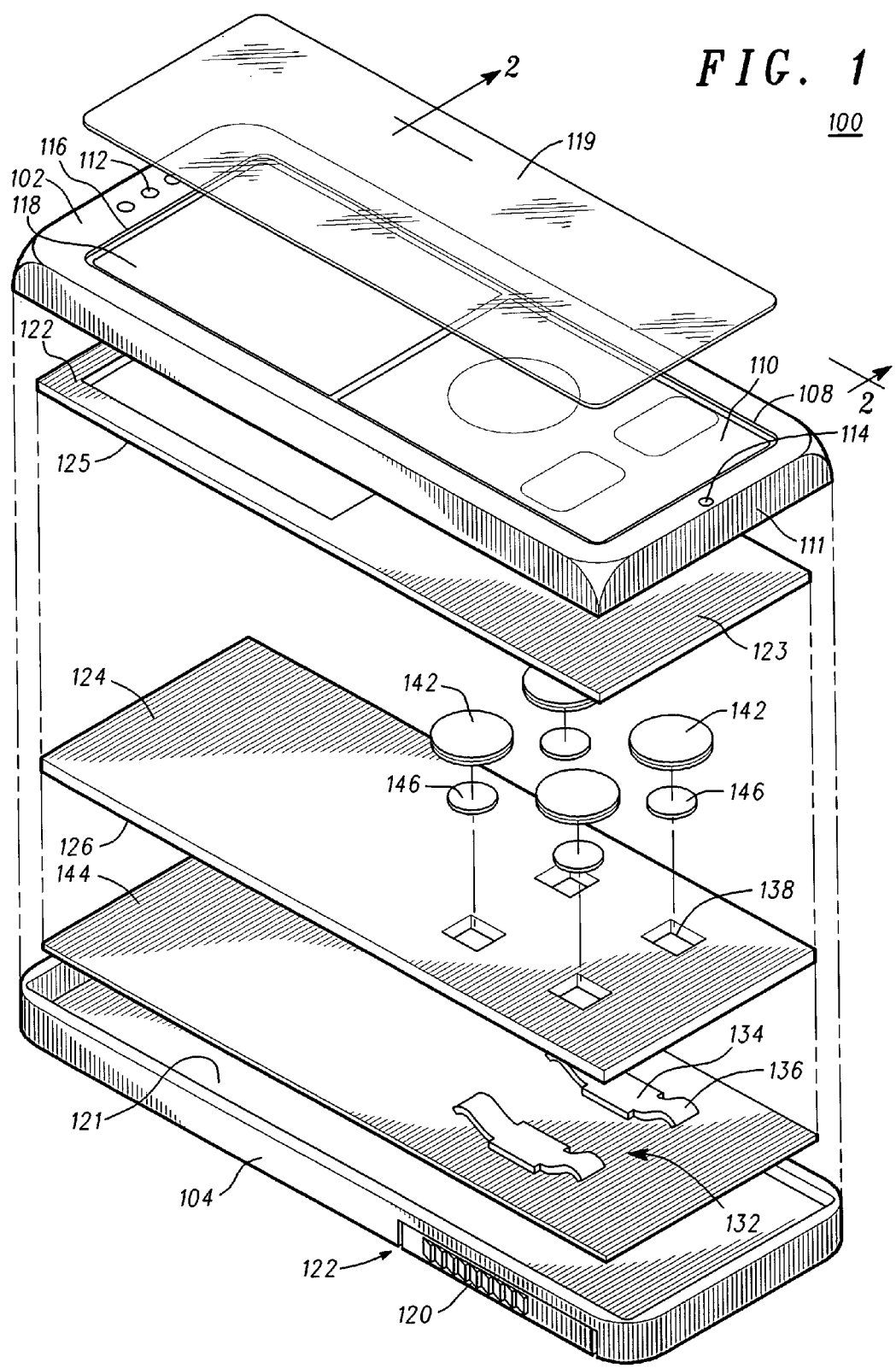
FIG. 1 is an exploded view of a cellular telephone in accordance with an exemplary embodiment.

The following detailed description of the invention is merely exemplary in nature and is not intended to limit the invention or the application and uses of the invention. Furthermore, there is no intention to be bound by any theory presented in the preceding background of the invention or the following detailed description of the invention.

A piezoelectric ceramic element or multiple piezoelectric ceramic elements are directly bonded to the backbone structure of portable devices, for example the metal or plastic chassis of a cell phone. A chassis of a cell phone provides structural rigidity of the phone and serves as a structural plate for the attachment of most phone modules and components. The piezoelectric ceramic elements and an input device, e.g., a morphable user interface, are bonded to opposite sides of the chassis in one exemplary embodiment. Upon application of an electric field, the in-plane shrinkage or expansion of the piezoelectric elements causes localized flexing motion of the chassis and provides tactile feedback at the interface of the input device. The input device is not directly pushed or pulled by separated piezoelectric bender actuators, but is part of the structure deformed (flexed) by the integrated piezoelectric ceramic elements. The motion of the input device is flexing, rather than an up/down movement by multiple piezoelectric actuators actuating at multiple points.

In accordance with one exemplary embodiment, at least one piezoelectric actuator, e.g., a piezoelectric bender, is bonded directly to a metal plate abutting the input device for which the haptic feedback is intended. This direct placement provides flextensional bending movement of the input device, and thus provides tactile feedback including true keyclick like tactile feedback to a user, including a low displacement of about 1.0 to 30.0 micrometers, proven reliability under bonding, low cost, and simple mechanical assembly.

Piezoelectric actuators are uniquely capable of delivering a fast, e.g., 1.0 to 10.0 milliseconds, high acceleration, e.g., 1-100 g, response needed to simulate key click responses. This class of response allows for replacement of mechanical dome switches by piezoelectric actuators for ultra thin keypads (morphable user interfaces). Piezoelectric actuators are also able to provide a broadband movement (1-2000 Hz) as opposed to the fixed frequency response of typical electromagnetic vibration motors.

The piezoelectric elements shrink or expand in the lateral direction when subject to an electric field, causing a much amplified perpendicular movement in its center with the constraint from being bonded to a hard surface, such as a phone chassis, and generate a click like acceleration curve and sensation when driven by a square wave. Under a sinusoidal driving voltage, the actuators could generate displacement that falls into the comfort zone for vibrotactile feedback. Piezoelectric actuators could also be operated in a wide frequency range, allowing broadband haptic responses. Power consumption of piezoelectric actuators is generally comparable to or less than that of DC rotary motors. The actuators' latency (the time required to ramp up to full speed) is small enough to allow users to have nearly instantaneous response in interactive applications.

Although it is possible to drive the piezoelectric elements with a single pulse to generate a click-like tactile feel that is similar to the feel from a popple dome, it is possible to drive the piezoelectric elements with multiple pulses/waves at lower peak voltage than the single pulse and still achieve same level of click-like feel. According to human factor studies in a controlled environment, the temporal acuity of human touch is about 5 ms, i.e., the minimum time in which humans can detect two consecutive tactile stimuli is about 5 ms. This tactile temporal acuity could well extend to 10-20 ms during normal multi modal (visual, audio and tactile) human interactions with electronic devices, in which the tactile mode is typically not the only mode of feedback. The method described herein comprises a multiple pulses/waves drive of piezoelectric actuators with the signal duration $\leq 20$ ms. The resultant tactile feel is perceived as single click-like feel due to the acuity of human touch. The peak voltage of these pulses/waves is significantly lower than that of a single pulse that gives a similar perceived feel. From a users' point of view, the level, or the strength of click feel, is the same regardless of when the piezoelectric actuators are driven with a multiple pulse/waves with lower peak voltage or a single pulse/wave with a higher peak voltage.

The lower voltage drive could significantly reduce the complexity and thus the cost of the driving circuitry. A lower voltage drive also reduces the likelihood of failure of piezoelectric actuators under high stress induced by high electric field, and consequently improves device reliability.

Figure 2:
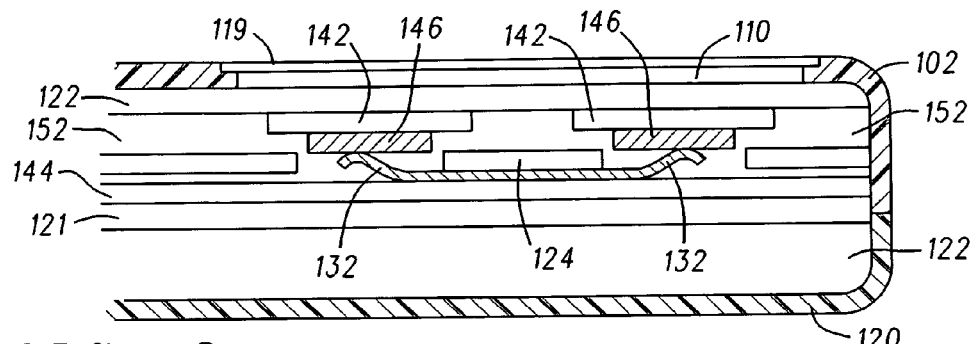
FIG. 2 is a partial cross section taken along line 2-2 of FIG. 1, without power applied to piezoelectric actuators contained within.

FIG. 1 is an exploded view of a cellular telephone 100 according to a first embodiment of the invention, and FIG. 2 is a partial cross section view taken along the line 2-2 of FIG. 1. The cellular telephone 100 is only one exemplary embodiment. It should be understood that any type of portable electronic device may be used with the invention described herein. The cellular telephone 100 comprises a front housing part 102, and a rear housing part 104. The front housing part 102 supports an optional antenna (not shown) and includes an opening 108 that accommodates a morphable user interface 110. A speaker grill 112 and a microphone grill 114 are also provided on the front housing part 102. A display opening 116 is also provided in the front housing part 102 that accommodates a display 118. A battery compartment cover 120 is provided for covering a battery compartment 122 in the rear housing part 104. An opening (not shown) is provided in the battery floor 121 for wiring to couple a battery (not shown) positioned in the battery compartment 122 to circuitry (not shown) on the back side 126 of the printed circuit board 124. A transparent cover 119 is positioned over the display 118 and input device 110.

The front 102 and rear 104 housing parts enclose, among other items to be discussed, a chassis 122 secured to the front housing part 102. The chassis 122 comprises a first planar side 123 that securely positions the morphable user interface 110 within the opening 108 and the display 118 within the opening 116. The first planar side 123 of the chassis 122 is adjacent to and in contact with the planar side 111 of the input device 110. Also enclosed within the front 102 and rear 104 housing parts is a printed circuit board 124. A plurality of electrical circuit components (not shown), that make up one or more electrical circuits of the cellular telephone 100 are mounted on a back side 126 of the circuit board 124. Circuits of the cellular telephone 100 are more fully described below with reference to a functional block diagram shown in FIG. 6.

Contact devices 132 each include a base 134 secured to the circuit board 124 by a solder float (not shown), and arms 136 that extend through openings 138 in the circuit board 124 to make electrical contact with each of the piezo actuators 142. The contact devices are further coupled to circuitry (not shown) on the circuit board 124. Contact devices 132 comprise a conductive material, such as metal, and in the exemplary embodiment comprise a metal having an inherent spring action, or torque, to exert a force on the piezo actuators 142.

A layer of mylar 144 (FIG. 2) may be adhesively attached between a battery floor 121 of the rear housing part 104 and the contact devices 134. An air gap 152 exists between the printed circuit board 124 and the layer 144. The contact device 132 makes contact with the piezoelectric actuators 142, optionally through a metal contact 146, which is preferably gold. The contact device 146 may apply a spring force (as shown) against the metal contact 146 for improved conductibility. In accordance with the exemplary embodiment, the piezoelectric actuators 142 are positioned directly on a second planar side 125 of the chassis 122 that makes contact with the morphable user interface 110. The chassis 122 and morphable user interface 110 are positioned in an adjacent manner such that a flexing of the chassis 122 flexes the morphable user interface 110.

Figure 3:
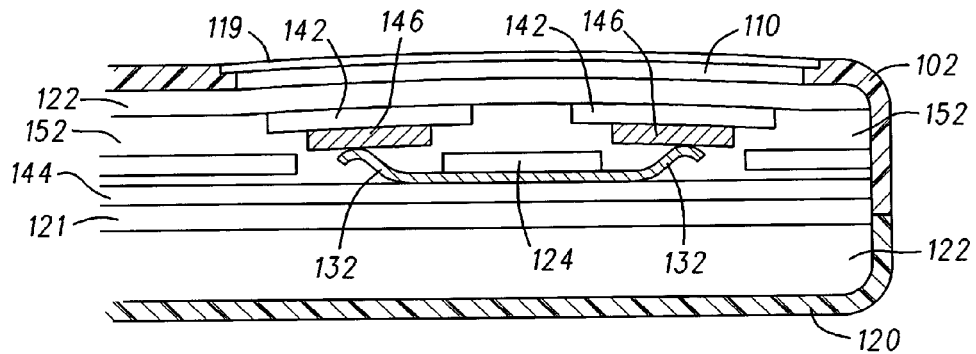
FIG. 3 is a partial cross section taken along line 2-2 of FIG. 1 with power applied to the piezoelectric actuators.

FIG. 2 shows one exemplary embodiment of how the morphable user interface 110 is secured by bonding to the front housing part 102 and the transparent cover 119 is bonded within an indent on front part 102 over the morphable user interface 110 and display 118. This example is only one way in which the morphable user interface 110 may be secured within the front housing part 102. Other examples may include, e.g., mechanical couplings. When an input, e.g., pushing on a displayed icon, is made to the morphable user interface 110, a signal is generated from, for example, a sensor (not shown) that detects movement or circuitry that detects the electronic signal generated by the input. This signal is sent to the contact devices 132 which activates the piezoelectric devices 142. The flexing movement of the piezoelectric devices 142 is transferred through the chassis 122 to the morphable user interface 110 (FIG. 3). Since the morphable user interface 110 is secured at its periphery 302, and not in the center, a flexing motion of the morphable user interface 110 results.

Figure 4:
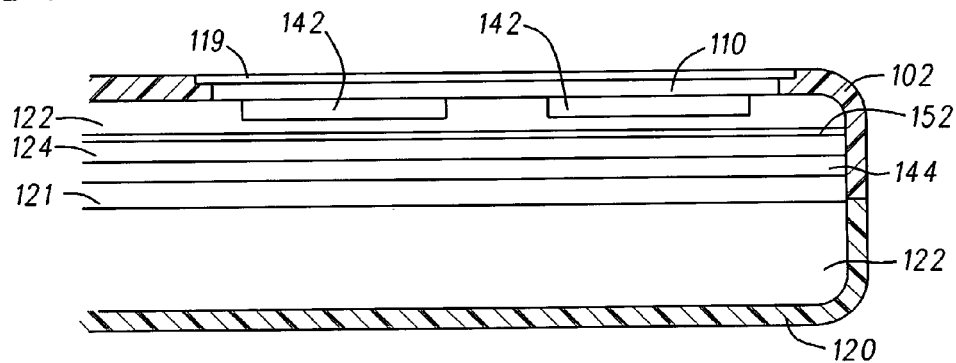
FIG. 4 is a partial cross section of a second exemplary embodiment without power applied to piezoelectric actuators contained within.
Figure 5:
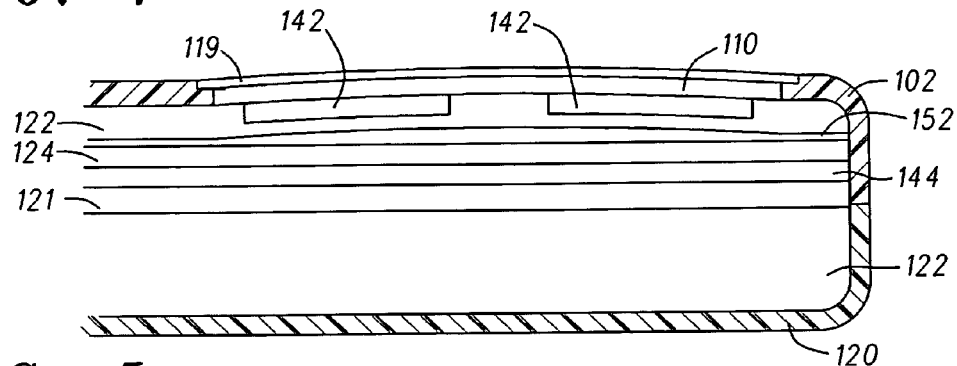
FIG. 5 is a partial cross section of the second exemplary embodiment with power applied to piezoelectric actuators.

A second exemplary embodiment shown in FIG. 4 includes the piezoelectric actuators 142 positioned within recesses of the chassis 122 and directly against the input device 110. A conductive bonding material (not shown) is positioned between the input device and the piezoelectric actuators 142 for securing the two together and providing power to the piezoelectric actuators 142. FIG. 5 illustrates the second exemplary embodiment with power applied to the piezoelectric actuators 142 and the resulting flexing of the chassis 122, input device 110, and transparent cover 119.

Figure 6:
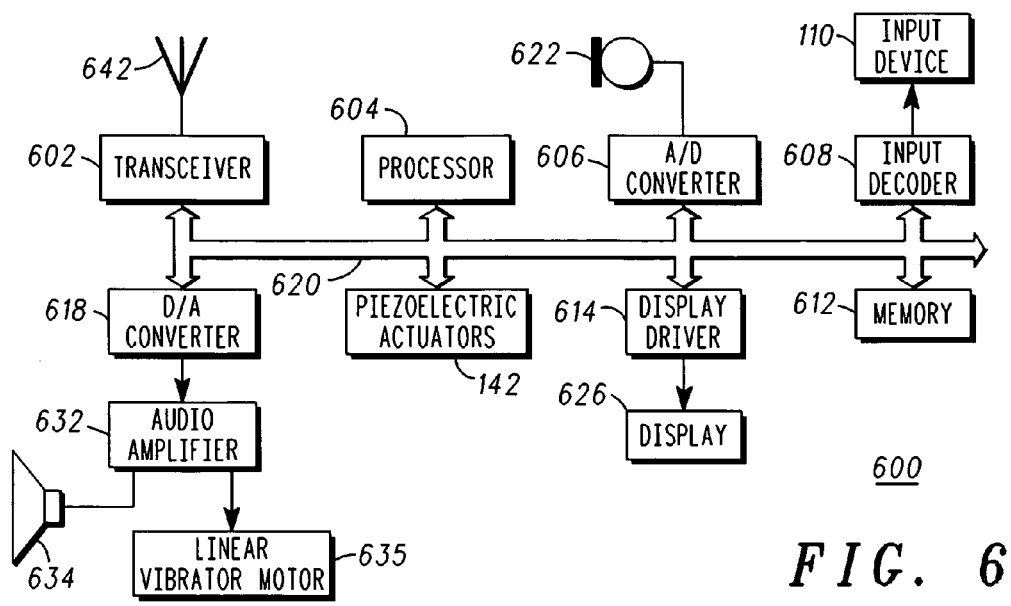
FIG. 6 is a block diagram of the cellular telephone shown in FIG. 1.

FIG. 6 is a block diagram of the cellular telephone 100 shown in FIGS. 1-3 according to the first embodiment of the invention. The cellular telephone 100 comprises a transceiver 602, a processor 604, an analog to digital converter (A/D) 606, a input decoder 608, a memory 612, a display driver 614, a digital to analog converter (D/A) 618, and piezoelectric actuators 142, all coupled together through a digital signal bus 620.

The transceiver module 602 is coupled to the antenna 106. Carrier signals that are modulated by data, e.g., digitally encoded signals for driving the MFT or digitally encoded voice audio, pass between the antenna 642, and the transceiver 602.

The input device 110 is coupled to the input decoder 608. The input decoder 608 serves to identify depressed keys, for example, and provide information identifying each depressed key to the processor 604. The display driver 614 is coupled to a display 626.

The D/A 618 is coupled through an audio amplifier 632 to a speaker 634 and a vibratory motor 635. The D/A 618 converts decoded digital audio to analog signals and drives the speaker 634 and vibratory motor 635. The audio amplifier 632 may comprise a plurality of amplifiers with each driving a separate speaker/vibratory motor combination.

The memory 612 is also used to store programs that control aspects of the operation of the cellular telephone 100. The memory 612 is a form of computer readable medium.

The transceiver 602, the processor 604, the A/D 606, the input decoder 608, the memory 612, the display driver 614, the D/A 618, the audio amplifier 632, and the digital signal bus 620, are embodied in the electrical circuit components (not shown) and in interconnections of the circuit board 124 shown in FIG. 1.

Figure 7:
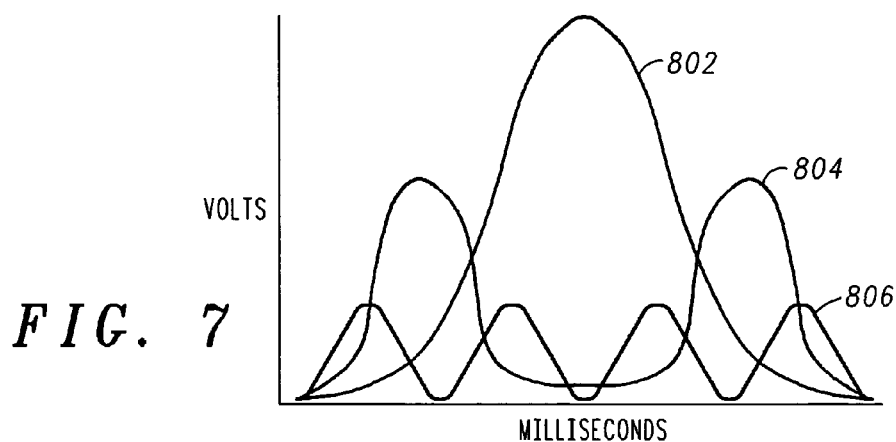
FIG. 7 is a graph of three voltage levels having three periods resulting in the perception of a single pulse in accordance with the exemplary embodiment.
Figure 8:
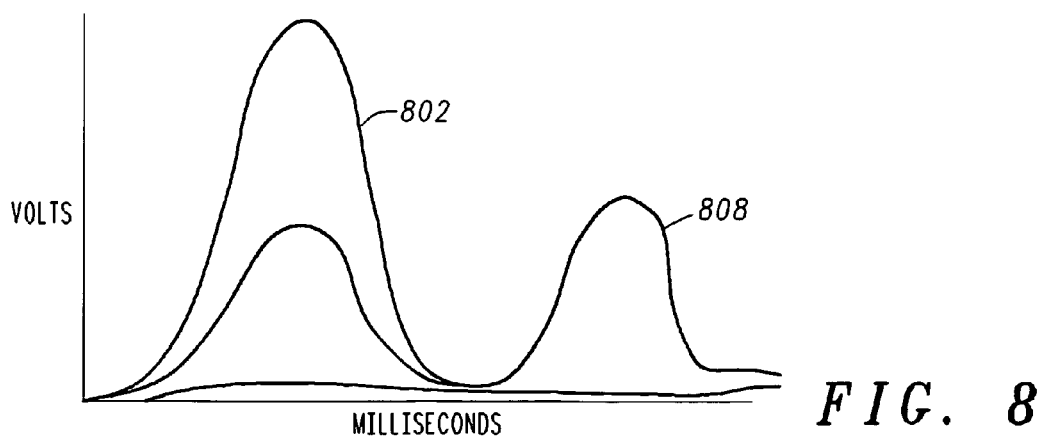
FIG. 8 is a graph of multiple pulses having the same period resulting in the perception of a single pulse in accordance with the exemplary embodiment.

Referring to FIG. 7, a single pulse 802 may drive the piezoelectric actuators 142, resulting in the single click-like feel applied to the input device 110; however, the voltage of the single pulse 802 is higher than desired for portable electronic devices. Multiple pulses having a duration/period, below the temporal acuity of human touch provide a haptic feedback that humans decipher as a single pulse. The duration of the pulses may comprise 20 milliseconds or less, or preferably 10 milliseconds or less, or more preferably 5 milliseconds or less. The perceived sensation, characterized by fingertip tactile threshold and/or comfort levels, is identical to that from actuators driven by a single pulse with higher peak voltage. The use of multiple pulses require a much lower voltage than the use of a single pulse, and thus are much more desirable for use with portable electronic devices where a higher voltage is undesirable. Examples include two and four peak sinusoidal waveforms 804 and 806, respectively. The waveform 804 as shown is twice the frequency of the single pulse 802; however, it should be understood that any frequency could be used as long as the duration of the pulses 804 or 806 is less than the human temporal acuity. When the sensor (not shown) or circuitry within the input device 110 indicates that an input has been received and feedback should be provided by the piezoelectric actuators 142 to the input device 110, the waveforms 804 or 806, for example, are generated by the microprocessor 704 to drive the piezoelectric actuators 142. The use of multiple pulses reduces the complexity and therefore the cost of driving circuitry, and improves the piezoelectric actuators 142 reliability. FIG. 8 illustrates a multiple pulse waveform 808 having the same frequency but a lower voltage than the single pulse 802.

While a standard square wave pulse can be used to drive the piezoelectric actuator, some type of filtering is desirable to eliminate higher frequency audible noise associated with the sharp transitions inherent in a square pulse. For example, a sinusoidal waveform in the frequency range of 100-500 Hz has been found to produce an excellent haptic response while minimizing audible noise. A DC offset is also preferred such that the waveform begins at ground potential and drives the piezoelectric actuator from ground to positive voltage, thus moving the actuator in only one direction (i.e. upward into the users finger). A waveform termed a "raised cosine", which is an inverted cosine wave with a DC offset equal to the amplitude of the cosine, is a good example of such a driving pulse. This type of pulse in the frequency range of 100 Hz-500 Hz has been found to be the most desirable waveform for optimized haptic performance and minimal audible noise.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method of providing haptic feedback to an input device of an electronic device, comprising:
   providing a voltage waveform to activate one or more piezoelectric actuators, the waveform comprising at least two pulses within a 20 millisecond duration; and
   moving the input device in response to the piezoelectric actuators being activated.

2. The method of claim 1 wherein the providing step comprises providing a voltage waveform comprising at least two pulses within a 10 millisecond duration.

3. The method of claim 1 wherein the providing step comprises providing a voltage waveform comprising at least two pulses within a 5 millisecond duration.

4. The method of claim 1 wherein the providing step comprises providing a sinusoidal waveform.

5. The method of claim 1 wherein the providing step comprises providing a filtered square waveform.

6. The method of claim 1 wherein the providing step comprises providing a direct current offset.

7. The method of claim 1 wherein the providing step comprises providing a raised cosine waveform.

8. A method of providing haptic feedback to a flexible morphable input device in an electronic device, comprising:
   providing a voltage waveform to activate one or more piezoelectric actuators, the waveform comprising at least two pulses comprising a duration within the temporal acuity of human touch; and
   flexing the morphable input device in response to the piezoelectric actuators being activated.

9. The method of claim 8 wherein the providing step comprises providing a voltage waveform comprising at least two pulses within a 10 millisecond duration.

10. The method of claim 8 wherein the providing step comprises providing a voltage waveform comprising at least two pulses within a 5 millisecond duration.

11. The method of claim 8 wherein the providing step comprises providing a sinusoidal waveform.

12. The method of claim 8 wherein the providing step comprises providing a filtered square waveform.

13. The method of claim 8 wherein the providing step comprises providing a direct current offset.

14. The method of claim 13 wherein the providing step comprises providing a raised cosine waveform.

15. A method of providing haptic feedback in an electronic device having a chassis plate comprising a flexible material having a first planer side and a second planer side, a morphable input device comprising a flexible material and having a planer side positioned adjacent to and in contact with to the first planer side of the chassis, one or more piezoelectric actuators secured to the second planer side of the chassis plate, and circuitry for driving the piezoelectric actuator, comprising:
   sensing an input to the morphable input device by the circuitry;
   providing a voltage waveform from the circuitry to activate the at least one piezoelectric actuators, the waveform comprising at least two pulses within a 20 millisecond duration; and
   flexing the chassis plate and the morphable input device in response to the piezoelectric actuators being activated.

16. The method of claim 15 wherein the providing step comprises providing a voltage waveform comprising at least two pulses within a 10 millisecond duration.

17. The method of claim 15 wherein the providing step comprises providing a voltage waveform comprising at least two pulses within a 5 millisecond duration.

18. The method of claim 15 wherein the providing step comprises providing a sinusoidal waveform.

19. The method of claim 15 wherein the providing step comprises providing a filtered square waveform.

20. The method of claim 15 wherein the providing step comprises providing a direct current offset.

21. The method of claim 20 wherein the providing step comprises providing a raised cosine waveform.

22. The electronic device of claim 15 wherein the providing a voltage waveform drives the piezoelectric actuator with a wave to provide a single keyclick like tactile feedback.

* * * * *